April 13, 1943.   G. B. WEAVER   2,316,477
SHAFT DRIVE FOR MOTORCYCLES
Filed Aug. 18, 1941   3 Sheets-Sheet 1

INVENTOR
GEORGE B. WEAVER
BY Chapin & Neal
ATTORNEYS

April 13, 1943.  G. B. WEAVER  2,316,477
SHAFT DRIVE FOR MOTORCYCLES
Filed Aug. 18, 1941  3 Sheets-Sheet 2
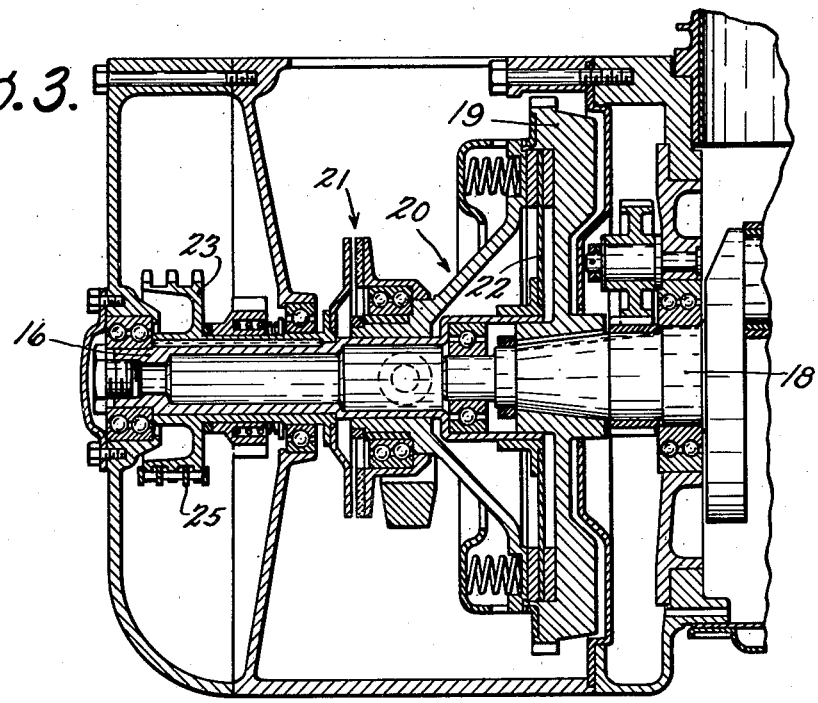
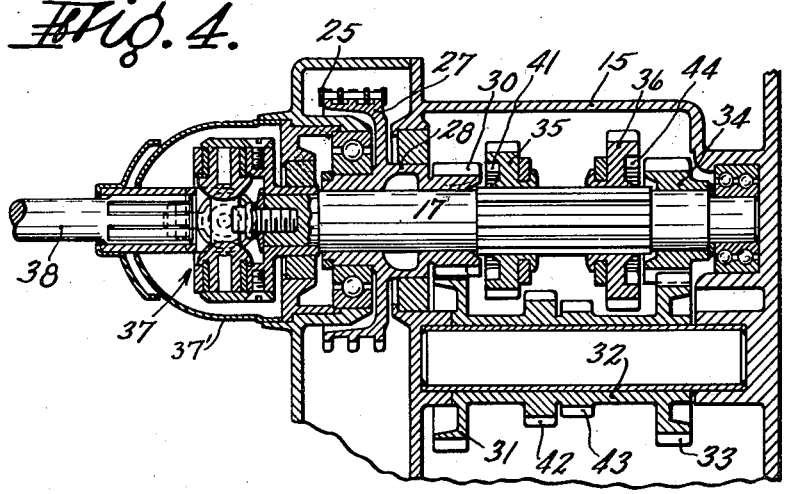
INVENTOR
GEORGE B. WEAVER
BY Chapin + Neal
ATTORNEYS

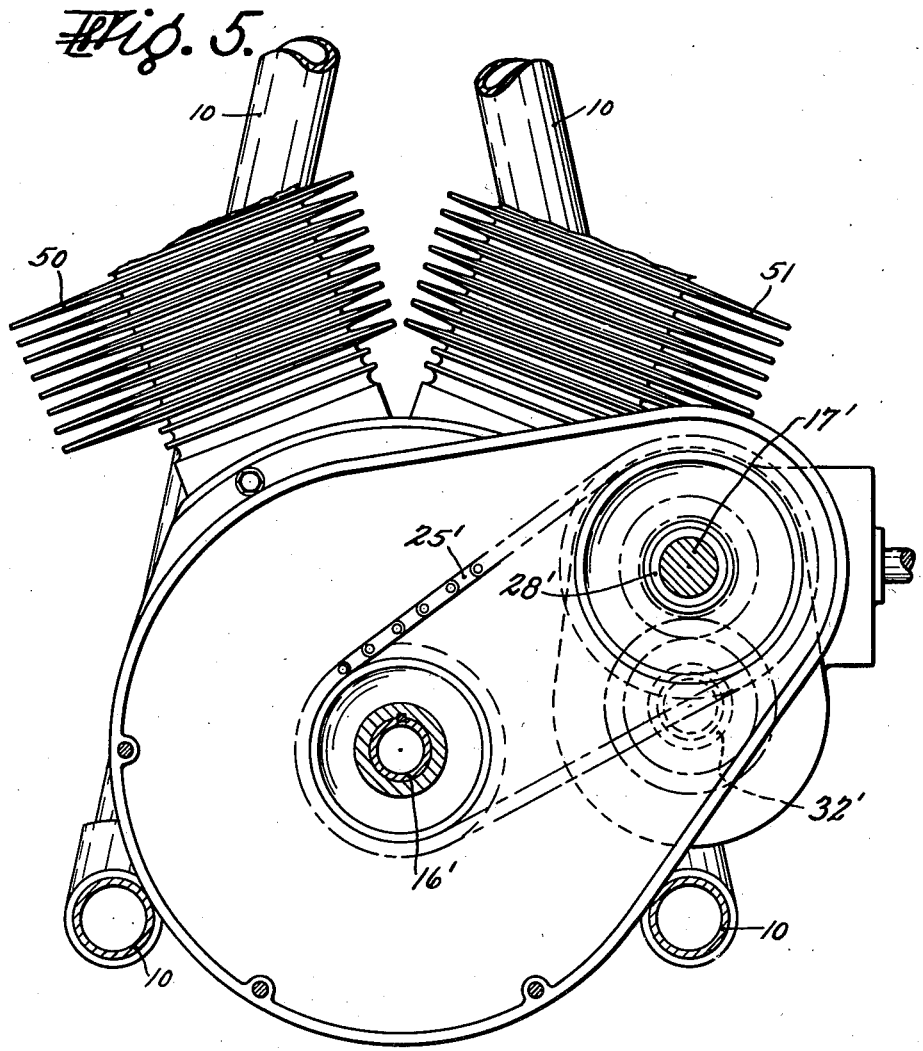

Patented Apr. 13, 1943

2,316,477

UNITED STATES PATENT OFFICE 2,316,477

SHAFT DRIVE FOR MOTORCYCLES

George B. Weaver, Springfield, Mass., assignor to Indian Motocycle Company, Springfield, Mass., a corporation of Massachusetts Application August 18, 1941, Serial No. 407,255

11 Claims. (Cl. 180—33)

This invention relates to an improvement in motorcycles, and more particularly to a novel arrangement of the motor and the transmission and driving elements of such vehicles with respect to each other and the frame of the vehicles.

Among the objects of the invention are the more efficient use of shaft drives as distinguished from chain drives, shortened wheel bases, or the more efficient use of the space afforded by a given wheel base, and improved motor cooling.

In order to lower the center of gravity and secure desired stability, the motor is placed as low in the frame of the motor cycle as possible and provide the necessary road clearance. This practice brings the crank shaft of the motor below the level of the axle of the rear wheel of the motor cycle, to which power must be transmitted from the motor. It has proved impractical under these conditions to employ a drive or propeller shaft as the means of delivering power to the rear wheel from the motor since the inclination of the shaft (from the level of the motor crank shaft up to the level of the rear axle) imposes a destructive degree of angular movement in the universal joint between the propeller shaft and the crank shaft or "transmission" of the motor. As a result recourse has been had to chain drives.

Where shaft drives are used it has been necessary to raise the motor, as shown for example in the patent to Notman 1,420,638, issued June 27, 1922, so that the motor crank shaft is substantially on a level with the rear axle, thus sacrificing the advantages of a low center of gravity. This Notman patent also illustrates the increased wheel base which has heretofore been found necessary to accommodate such an arrangement, that is, the length of the clutch mechanism and the transmission are successively added to the length of the four cylinder motor.

A shaft drive has many advantages, well known to the art, as compared with chain drives, and my invention makes possible a much more extensive use of the shaft drive in motor cycle construction and without sacrifice of stability or the use of excessively long wheel bases. Also, as later pointed out, it permits a more efficient use of V-type motors.

In the accompanying drawings:

Fig. 3 is a sectional view substantially on line 3—3 of Fig. 2;

Fig. 4 is a sectional view substantially on line 4—4 of Fig. 2; and

Fig. 5 is a view similar to Fig. 2, indicating the application of my invention to a V-type motor.

Figure 1:
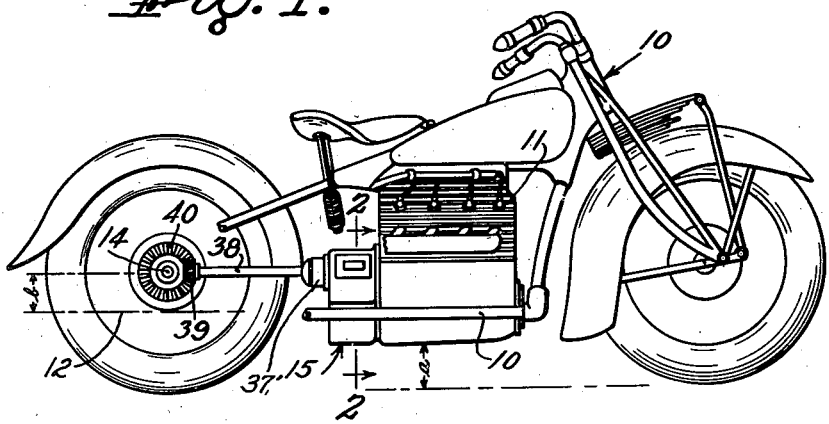
Fig. 1 is a side elevational view of a four cylinder motorcycle embodying my invention, parts being broken away.

Referring to the drawings, the frame of the motorcycle is generally indicated at 10. A four cylinder motor, with its cylinders in line, is shown at 11. The motor 11 is placed as low in the frame as is consistent with providing the safe minimum road clearance $a$, (Fig. 1) thereby securing a low center of gravity, and the maximum stability. This position of the motor relative to the frame brings the axis of rotation of the motor crank shaft, indicated at 12, a distance $b$ below the level of the axle 14 of the rear wheel. In Fig. 2 the dotted lines 12' and 14' indicate the levels respectively of the motor shaft and rear axle. This is the condition which under previous practice would prohibit the use of a propeller shaft to the rear wheel. According to my invention, I meet the condition by placing the "transmission" to one side, above and parallel to the clutch mechanism, instead of in the conventional end to end relation. These elements are conveniently enclosed in a single housing indicated at 15. The novel upwardly offset parallel relation of the clutch mechanism and transmission is best shown in Fig. 2, where the driven clutch shaft, which is in line with the motor crank shaft, is shown at 16 and the transmission tail shaft is shown at 17. In this view the dotted line 19 indicates the outer circumference of the fly wheel which is located just forward of the transmission and partially overlapping the same transversely as shown.

Referring to Fig. 3, the motor crankshaft is shown at 18, the motor flywheel at 19, and the usual clutch and associated mechanism is indicated generally at 20 including clutch brake mechanism 21 and clutch shaft 16. The driven clutch member 22 is secured to the front end of the clutch shaft 16. A sprocket 23, affixed to the rear end of said clutch shaft 16 is connected by chain 25 to a sprocket 27 forming part of a quill gear or hollow shaft 28 which is rotatably mounted on the transmission tail shaft 17. The primary shaft structure of the transmission comprises the aforesaid quill gear 28 as its driving element and the tail shaft 17 (extending through quill gear 28) as its driven element. The gear teeth 30 of the quill gear 28 are in constant mesh with the gear teeth 31 formed on jack shaft 32, which constitutes the secondary shaft structure of the transmission. A gear 33 formed on the forward end of the jack shaft is constantly in mesh with a pinion 34 rotatably mounted on shaft 17. A pair of gears 35 and 36 are separately splined on shaft 17 intermediate gears 30 and 34 and are adapted to be independently moved longitudinally thereon by the usual shift lever, not shown.

While the arrangement described, viz., that of mounting the transmission in parallelism with the clutch mechanism, makes possible the shorter wheel base, it is also desirable for compactness to keep the transmission laterally in close proximity to the clutch mechanism, and avoid its extending forward beyond the fly wheel. To this end the transmission itself is folded up, so to speak, in compact form by arranging the two elements of the primary shaft, viz., the driving and driven elements one partially within the other instead of wholly in end to end relation as is usually the case. This serves the advantage of making the transmission compact enough so that it may lie wholly behind the transverse plane of the fly wheel. In order to extend forward beyond the fly wheel, either the transmission must be set at a relatively wide space from the clutch mechanism or the fly wheel must be made small, and neither of these alternatives is as desirable as the arrangement I have shown.

Figure 2:
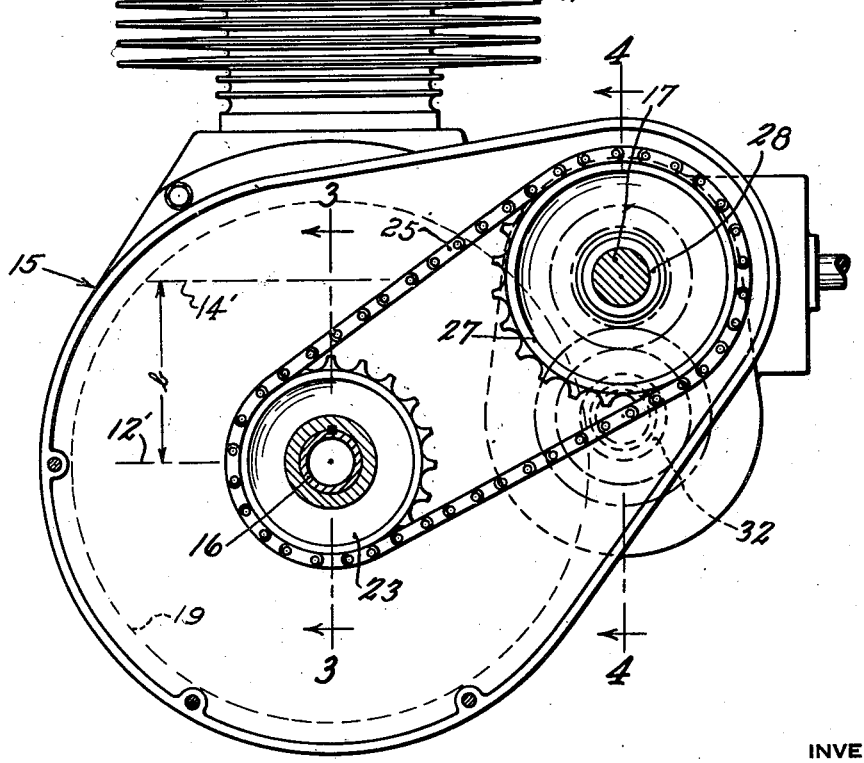
Fig. 2 is a sectional view, on a larger scale, taken substantially on line 2—2 of Fig. 1, showing the manner of connecting the crank shaft assembly to the transmission assembly.

The tail shaft 17 is positioned at the level of the rear axle 14, and is directly connected by a suitable universal joint 37 (Fig. 4) to the propeller shaft 38 which carries at its rear end a bevel gear 39, meshing with a bevel gear 40 secured to axle 14, Fig. 1. A cover casing 37' is provided as shown for the universal joint.

Referring to Fig. 4, which shows the parts in neutral position, gear 35 is provided with an internal ring of clutch teeth 41 adapted when the gear 35 is moved to the left to engage the external ring of clutch teeth 30 and connect the quill gear 28 directly to tail shaft 17 which is connected by universal joint 37 to the motorcycle propeller shaft 38. When gear 35 is moved to the right in Fig. 4 it is brought into mesh with a gear 42 formed on jack shaft 32 forwardly of gear 31 and the drive is through gears 30, 31, shaft 32, and gears 42, 35, to shafts 17, 38. When gear 36 is shifted to the left in Fig. 4 it is brought into mesh with a gear 43 formed on the jack shaft, forwardly of gear 42, and the drive is through gears 30, 31, shaft 32 and gears 43, 36, to shafts 17, 38. Gear 36 is formed with internal clutch teeth 44 which engage external clutch teeth 34 at the forward end of the jack shaft when gear 36 is shifted to the right in Fig. 4, thereby locking gear 34 to shaft 17, whereby the drive is through gears 30—31, shaft 32, gears 33, 34, to shafts 17, 38.

It will be noted that the power train after proceeding rearwardly through the clutch to the end of the clutch shaft 16, turns at right angles through chain 25 to the upwardly offset hollow shaft or quill gear 28 and then proceeds forwardly via the jack shaft 32 to the transmission tail shaft 17 which carries it rearwardly through the aforesaid quill gear or hollow shaft 28 to the propeller shaft 38 and the rear wheel. This "overlapping" of the power train which places the clutch shaft and the four speed transmission shaft substantially side by side, rather than end to end, reduces the overall length of the power train and consequently the necessary wheelbase. It has further advantage of making possible the use of a horizontal propeller shaft and a relatively low crank shaft. The shafts 17 and 38 being normally in line, no substantial angular movement takes place in the universal joint 37.

A substantial advantage of my construction is that the basic speed ratio between the crank shaft and drive shaft can be changed by substituting sprockets of different diameter at 23 and 27 without requiring any change in the rest of the structure.

By my invention it is possible to set a V-motor with its crank shaft extending longitudinally, instead of transversely, of the frame, as shown in Fig. 5. The motor cylinders 50 and 51 extend outwardly from the frame, providing a more efficient, and equal, cooling of both cylinders. The driving connection of the V-motor shown in Fig. 5 is exactly similar to that previously described, the clutch shaft 16' being connected to the hollow shaft or quill gear 28' by a silent chain 25'. From shaft 28' power is transmitted to the forwardly extending jack shaft 32' to shaft 17' and thence to the rear wheel by means of a universal coupling and a drive shaft, with all the advantages previously described.

I claim:

1. In a motorcycle which includes a frame, front and rear wheels mounted in the frame, and a motor carried by the frame intermediate the wheels, the crank shaft of the motor being below the level of, and at right angles to the axle of the rear wheel, a power train from the crank shaft to the axle of the rear wheel which comprises a clutch mechanism and a speed change transmission mechanism arranged in sidewise parallel relationship, the forward end of the clutch mechanism being connected to the crank shaft and the rear end of the clutch mechanism being connected by a laterally directed drive means to the rear end of the transmission mechanism, said transmission mechanism extending forwardly from its connection with said laterally directed drive means, and a horizontal drive shaft including a universal joint connected to the axle of the rear wheel and connected to said transmission mechanism forwardly of said laterally directed drive member.

2. In a motorcycle which includes a frame, front and rear wheels mounted in the frame, and a motor carried by the frame intermediate the wheels, the crank shaft of the motor being below the level of, and at right angles to, the axle of the rear wheel, a power train from the crank shaft to the axle of the rear wheel which comprises a rearwardly extending clutch mechanism in line with the crank shaft, a driving means connected to the rear end of the clutch mechanism and directed laterally upwardly to the level of the axle of the rear wheel and terminating in a hollow shaft, a forwardly directed speed change transmission driven from said hollow shaft and driving a horizontal shaft extending rearwardly through said hollow shaft to a driving connection with the axle of the rear wheel, and a universal joint in said horizontal shaft intermediate its connection to said axle and the hollow shaft.

3. In a motorcycle which includes a frame, front and rear wheels mounted in the frame, and a motor carried by the frame intermediate the wheels, the crank shaft of the motor being below the level of, and at right angles to, the axle of the rear wheel, a clutch mechanism extending rearwardly from and aligned with the crank shaft, a hollow shaft positioned substantially at the level of the axle of the rear wheel, a driving connection between the driven member of the clutch mechanism and the rear end of the hollow shaft, a forwardly extending jack shaft driven from the forward end of the hollow shaft, a transmission shaft extending forwardly and rearwardly through said hollow shaft, selective speed gearing connections between the jack shaft and the transmission shaft forwardly of the hollow shaft, and a horizontal drive shaft connected at its rear end by bevel gears to the axle of the rear wheel and connected at its forward end to the transmission shaft by a universal joint, rearwardly of the hollow shaft.

4. In a motorcycle which includes a frame and front and rear wheels mounted in the frame, a V-motor carried by the frame intermediate the wheels and having its crank shaft below the level of, and at right angles to the axle of the rear wheel, a clutch mechanism extending rearwardly from the crank shaft, a driving member connected to the rear end of the clutch mechanism, and directed laterally upwardly to the level of the axle of the rear wheel and terminating in a hollow shaft, a forwardly extending change speed transmission mechanism driven from the forward end of said hollow shaft and a shaft driven from said change speed transmission mechanism and extending rearwardly through said hollow shaft to a driving connection with the axle of the rear wheel, said last named shaft being provided with a universal joint intermediate its connection to the rear axle and the hollow shaft.

5. In a motorcycle which includes a frame, front and rear wheels mounted in the frame, a motor carried by the frame intermediate the wheels, the crank shaft of the motor extending longitudinally of the motorcycle, and being located below the level of the axle of the rear wheel, a fly wheel at the rear of said crank shaft, clutch mechanism extending rearwardly from said fly wheel, speed change transmission mechanism arranged in side by side relationship with said clutch mechanism, a driving connection between the rear end of said clutch mechanism and the rear end of said transmission mechanism, said transmission mechanism being extended forwardly of said driving connection and terminating at the rear of the transverse plane of said fly wheel, and a driving connection from said transmission mechanism to the rear wheel comprising a propeller shaft and a universal joint.

6. In a motorcycle which includes a frame, front and rear wheels mounted in the frame, a motor carried by the frame intermediate the wheels, the crank shaft of the motor extending longitudinally of the motorcycle, and being located below the level of the axle of the rear wheel, a fly wheel at the rear of said crank shaft, clutch mechanism extending rearwardly from said fly wheel, speed change transmission mechanism arranged in side by side relationship with said clutch mechanism, a driving connection between the rear end of said clutch mechanism and the rear end of said transmission mechanism, said transmission mechanism being extended forwardly of said driving connection and terminating at the rear of the transverse plane of said fly wheel, said transmission mechanism comprising a tail shaft positioned on a level with the axle of the rear wheel and a driving connection between said transmission tail shaft and the rear wheel comprising a horizontally extended propeller shaft and a universal joint.

7. In a motorcycle which includes a frame, front and rear wheels mounted in the frame, a motor carried by the frame intermediate the wheels, the crank shaft of the motor extending longitudinally of the motor cycle and being located below the level of the axle of the rear wheel, a fly wheel at the rear of said crank shaft, clutch mechanism comprising a clutch shaft in line with said crank shaft and extending rearwardly from said fly wheel, a speed change transmission comprising shafts arranged parallel to said clutch shaft, a driving connection between said clutch shaft and a shaft of said transmission, the shafts of said transmission extending forwardly of said driving connection and terminating at the rear of the tranverse plane of said fly wheel, a tail shaft of said transmission being located upwardly and laterally of said clutch shaft and positioned on a level with the axle of the rear wheel, and a propeller shaft in line with said transmission tail shaft and extending horizontally to the rear wheel for operating the same.

8. In a motorcycle which includes a frame, front and rear wheels mounted in the frame, a motor carried by the frame intermediate the wheels, the crank shaft of the motor extending longitudinally of the motorcycle and being located below the level of the axle of the rear wheel, a fly wheel at the rear of said crank shaft, clutch mechanism comprising a clutch shaft in line with said crank shaft and extending rearwardly from said fly wheel, a speed change transmission comprising primary and secondary shaft structures arranged parallel to said clutch shaft, said primary shaft structure comprising a quill gear and a transmission tail shaft extending through the hollow shaft of said quill gear, a driving connection between said clutch shaft and said quill gear, said primary and secondary shaft structures extending forwardly of said driving connection and terminating at the rear of the transverse plane of said fly wheel, said primary shaft structure being located upwardly and laterally of said clutch shaft and positioned on a level with the axle of the rear wheel, and a propeller shaft connected by a universal joint with said transmission tail shaft and extending horizontally to the rear wheel for operating the same.

9. In a motorcycle which includes a frame, front and rear wheels mounted in the frame, a motor carried by the frame intermediate the wheels, the crank shaft of the motor extending longitudinally of the motorcycle and being located below the level of the axle of the rear wheel, a fly wheel at the rear of said crank shaft, clutch mechanism comprising a clutch shaft in line with said crank shaft and extending rearwardly from said fly wheel, a speed change transmission comprising primary and secondary shaft structures arranged parallel to said clutch shaft, said primary shaft structure comprising a quill gear and a transmission tail shaft extending through the hollow shaft of said quill gear, a constantly engaged driving connection between said clutch shaft and the rear end of said quill gear, selectively engageable driving connections between the forward end of said quill gear and said tail shaft, said primary and secondary shaft structures extending forwardly of said driving connection and terminating at the rear of the transverse plane of said fly wheel, said primary shaft structure being located upwardly and laterally of said clutch shaft and positioned on a level with the axle of the rear wheel, and a propeller shaft connected by a universal joint with said transmission tail shaft and extending horizontally to the rear wheel for operating the same.

10. In a motorcycle which includes a frame, front and rear wheels mounted in the frame, a motor carried by the frame intermediate the wheels, the crank shaft of the motor extending longitudinally of the motorcycle and being located below the level of the axle of the rear wheel, a fly wheel at the rear of said crank shaft, clutch mechanism comprising a clutch shaft in line with said crank shaft and extending rearwardly from said fly wheel, a speed change transmission comprising primary and secondary shaft structures arranged parallel to said clutch shaft, said primary shaft structure comprising a quill gear and a transmission tail shaft extending through the hollow shaft of said quill gear, a driving connection between said clutch shaft and said quill gear, said primary and secondary shaft structures extending forwardly of said driving connection and terminating at the rear of the transverse plane of said fly wheel, and a propeller shaft connected by a universal joint with said transmission tail shaft and extending to the rear wheel for operating the same.

11. In a motorcycle which includes a frame, front and rear wheels mounted in the frame, a motor carried by the frame intermediate the wheels, the crank shaft of the motor extending longitudinally of the motorcycle and being located below the level of the axle of the rear wheel, a fly wheel at the rear of said crank shaft, clutch mechanism comprising a clutch shaft in line with said crank shaft and extending rearwardly from said fly wheel, a speed change transmission comprising primary and secondary shaft structures arranged parallel to said clutch shaft, said primary shaft structure comprising a quill gear and a transmission tail shaft extending through the hollow shaft of said quill gear, a constantly engaged driving connection between said clutch shaft and the rear end of said quill gear, selectively engageable driving connections between the forward end of said quill gear and said tail shaft, said primary and secondary shaft structures extending forwardly of said driving connection and terminating at the rear of the transverse plane of said fly wheel, and a propeller shaft connected by a universal joint with said transmission tail shaft and extending to the rear wheel for operating the same.

GEORGE B. WEAVER.